United States Patent
Malladi et al.

(10) Patent No.: US 10,379,939 B2
(45) Date of Patent: Aug. 13, 2019

(54) MEMORY APPARATUS FOR IN-CHIP ERROR CORRECTION

(71) Applicant: Samsung Electronics Co., Ltd., Suwon-si, Gyeonggi-do (KR)

(72) Inventors: Krishna T. Malladi, San Jose, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 15/470,657

(22) Filed: Mar. 27, 2017

(65) Prior Publication Data
US 2018/0189132 A1    Jul. 5, 2018

Related U.S. Application Data

(60) Provisional application No. 62/442,319, filed on Jan. 4, 2017.

(51) Int. Cl.
*G06F 11/10* (2006.01)
*G06F 21/64* (2013.01)
(Continued)

(52) U.S. Cl.
CPC .......... *G06F 11/1012* (2013.01); *G06F 21/64* (2013.01); *G11C 29/74* (2013.01);
(Continued)

(58) Field of Classification Search
CPC ............. G06F 11/1044; G06F 11/1064; G06F 11/1056; G11C 29/70; G11C 29/50;
(Continued)

(56) References Cited

U.S. PATENT DOCUMENTS 6,438,560 B1   8/2002   Loen
7,650,460 B2   1/2010   Cheriton
(Continued)

OTHER PUBLICATIONS

Cheriton, David, et al., "HICAMP: Architectural Support for Efficient Concurrency-safe Shared Structured Data Access", ASPLOS XVII Proceedings of the seventeenth international conference on Architectural Support for Programming Languages and Operating Systems, Mar. 3-7, 2012, pp. 287-300.
(Continued)

*Primary Examiner* — Thien Nguyen
(74) *Attorney, Agent, or Firm* — Lewis Roca Rothgerber Christie LLP

(57) ABSTRACT

A method of performing memory deduplication and single error correction double error detection (SEC-DED) in a computer memory, the method including reading data from an array of memory chips, calculating at least one hash based on the data, checking the one or more hashes against at least one of a physical line ID hash and against a secondary hash, determining whether an error is detected, when an error is detected, correcting the data by changing each bit of the array of the memory chips one at a time until no error is detected, wherein between changing each bit, at least one hash is calculated based on the changed data, and the one or more hash for the new data is compared against one or more of a physical line ID hash and against a secondary hash, and again determining whether an error is detected, and outputting the corrected data when no error is detected.

19 Claims, 3 Drawing Sheets

(51) Int. Cl.
*G11C 29/00* (2006.01)
*G11C 29/04* (2006.01)
*G11C 29/44* (2006.01)

(52) U.S. Cl.
CPC ............ *G11C 2029/0409* (2013.01); *G11C 2029/0411* (2013.01); *G11C 2029/4402* (2013.01)

(58) Field of Classification Search
CPC ............ G11C 29/08; G11C 2029/0411; G11C 2029/0409; G11C 2029/0401
See application file for complete search history.

(56) References Cited

U.S. PATENT DOCUMENTS

| | | | |
|---|---|---|---|
| 8,065,476 B2 | 11/2011 | Cheriton | |
| 8,230,168 B2 | 7/2012 | Cheriton | |
| 8,504,791 B2 | 8/2013 | Cheriton et al. | |
| 8,612,673 B2 | 12/2013 | Cheriton | |
| 8,938,580 B2 | 1/2015 | Cheriton | |
| 9,043,668 B2 | 5/2015 | Goss et al. | |
| 9,229,853 B2 | 1/2016 | Khan et al. | |
| 9,384,128 B2 | 7/2016 | Tuers et al. | |
| 9,501,421 B1 | 11/2016 | Cheriton | |
| 9,520,193 B2 | 12/2016 | Cheriton | |
| 2013/0275699 A1 | 10/2013 | Cheriton | |
| 2014/0317479 A1* | 10/2014 | Candelaria | G06F 11/1004 714/807 |
| 2014/0379671 A1* | 12/2014 | Barrus | G06F 11/1076 707/692 |
| 2015/0074339 A1 | 3/2015 | Cheriton | |
| 2016/0291891 A1 | 10/2016 | Cheriton | |
| 2017/0109049 A1 | 4/2017 | Cheriton | |

OTHER PUBLICATIONS

Litz, Heiner, et al., "Fine-grain Memory Deduplication for In-Memory Database Systems", Stanford University, 2013, 22 pages.

Kim, Yoongu, "Hicamp: Architectural Support for Efficient Concurrency-Safe Shared Structured Data Access—Cheriton et al.,", ASPLOS 2012; Nov. 18, 2013 (43 pages).

Stevenson, John Peter; "Fine-Grain In-Memory Deduplication for Large-Scale Workloads"; A Dissertation Submitted to the Department of Electrical Engineering and the Committee on Graduate Studies of Stanford University in Partial Fulfillment of the Requirements for the Degree of Doctor of Philosophy; http://puri.stanford.edu/rp831pi6163; Dec. 2013 (140 pages).

* cited by examiner

MEMORY APPARATUS FOR IN-CHIP ERROR CORRECTION

CROSS-REFERENCE TO RELATED APPLICATION(S)

This application claims priority to, and the benefit of, U.S. Provisional Application Ser. No. 62/442,319, filed on Jan. 4, 2017, the entire content of which is incorporated herein by reference.

FIELD

One or more aspects of embodiments according to the present invention generally relate to error correction in a memory module.

BACKGROUND

Double data rate synchronous dynamic random-access memory (DDR SDRAM) is a type of memory integrated circuit (IC) used in computers. DDR SDRAM is able to achieve faster transfer rates by using timing control of electrical data and clock signals, and is able to transfer data both on the rising edge and on the falling edge of the clock signal, thereby effectively doubling data bus bandwidth when compared to a single data rate SDRAM interface utilizing the same clock frequency, and thereby achieving nearly double the bandwidth.

Different generations of DRAM are able to use error-correcting code (ECC) memory during data storage to both detect and sometimes correct common types of data corruption. ECC memory is immune to single-bit errors through use of parity checking. In DRAM systems, parity checking is accomplished by storing a redundant parity bit representing the parity (odd or even) of data (e.g., one byte of data) stored in memory (e.g., stored in a parity device, or in an ECC chip, of the DRAM module), by independently computing the parity, and by comparing the stored parity to the computed parity to detect whether a data error/memory error has occurred.

Accordingly, to ensure that data retrieved from the DRAM module (e.g., a dual in-line memory module (DIMM)), which may correspond to a data word or data symbol, is the same as the data written to the DRAM module, ECC can correct errors that arise when one or more bits of the data are flipped to the wrong state.

That is, by using ECC redundancy, the ECC chip is capable of single error correction double error detection (SEC-DED), meaning that the ECC chip is able to detect the existence of two errors occurring in a single burst, and is also able to correct a single erroneous bit when occurring in isolation. That is, if one data chip is corrupted or lost, by using data of the remaining data chips and ECC data of the ECC chip, the data of the corrupted or missing data chip can be reconstructed. Accordingly, in standard ECC, SEC-DED enables correction of single-bit errors, and is able to detect two errors in a 64-bit datapath. However, conventional SEC-DED uses an extra chip to store ECC bits, and performs error detection and error correction in memory controller by using Hamming codes.

Additionally, DRAM systems may have chipkill mechanisms (e.g., single chipkill and double chipkill) for erasing, or disabling, nonfunctional data chips. Various chipkill mechanisms for DDR4 use two or more ECC devices/chips per memory channel to detect, locate, and erase nonfunctional chips. Accordingly, in standard ECC, chipkill mechanisms are able to correct entire chip failures (e.g., 4-bit chips). However, conventional chipkill mechanisms use SSCDCD for single chip failure (or) double chip sparing for double chip failure, with older models using a (128/144) scheme, while relatively newer modules using a (64/72) scheme.

For example, normal DDR4 has a prefetch length of 8n, a burst length of eight (i.e., eight bursts per memory transaction), and a memory channel width of sixty-four bits, where n is a number of bits of an interface width of the data used in the corresponding system architecture (e.g., if the interface width is 4-bit, then the prefetch length of the corresponding DDR4 system is thirty-two bits). Accordingly, DDR4 will transmit 512 bits for each memory transaction.

To continue increasing DDR interface bandwidth, a new DDR interface may increase the prefetch length. This new DDR interface may have prefetch length of 16n, which is twice of the prefetch length of current DDR4 interface. The new DDR interface will, therefore, transfer twice the amount of data transferred by the DDR4 system for each memory transaction. This new DDR interface may also have a burst length of sixteen (i.e., sixteen bursts of data in each individual memory transaction), and a memory channel width of thirty-two bits per memory channel, and will therefore also transmit 512 bits per memory channel per memory transaction. However, this DDR interface has two memory channels per DIMM, each DIMM being a module having multiple DRAM chips on a circuit board including chip pins to enable connection to a computer motherboard. The two memory channels of the DDR DIMM effectively work independently of one another.

Despite having a narrower memory channel than DDR4, the new DDR interface has a data width of thirty-two bits per memory channel, with eight data devices (e.g., 4-bit data chips) being configured to store and transfer data for each memory channel. This new DDR interface also has an ECC width of four bits per memory channel with one 4-bit ECC chip for each memory channel. Accordingly, to compensate for having half of the memory channel width of DDR4, this new DDR interface has twice the burst length as DDR4. Because this new DDR interface has two memory channels, each memory channel having eight 4-bit data chips dedicated to storing data, there will be a total of sixty-four bits of memory data per burst.

Furthermore, unlike DDR4, which has two ECC chips per memory channel, this new DDR interface may have a single ECC chip per memory channel, or even a single ECC chip per DIMM, to protect the sixteen data chips used for storing data. The new DDR interface can therefore have reduced ECC overhead when compared to DDR4. Accordingly, if a new DDR interface uses one ECC chip per memory channel, for every burst there will be eight bits of ECC data corresponding to the two 4-bit ECC chips, one ECC chip being in each of the two memory channels of the DIMM. Accordingly, such a new DDR interface will transmit 72 bits of data for every burst.

Modern servers require robust error correction and error detection to guarantee high RAS features. However, this comes with the overhead of additional device and controller complexities. Accordingly, it may be difficult to maintain DDR reliability, availability, and serviceability (RAS) using current DDR4 techniques, as system ECC overhead increases with the corresponding decrease in data width. Furthermore, chipkill techniques require additional ECC overhead due to the increased number of memory channels per DIMM. Moreover, as DRAM systems scale, even more robust reliability methods are necessary to guarantee end-to-end data integrity.

Accordingly, it may be useful to provide novel methods of error correction and data recovery, and to provide a DRAM DIMM that is able to correct some types of memory errors internally without assistance from a memory controller, and that is able to direct the memory controller to assist in memory correction for other types of errors that the DRAM is unable to correct internally.

The above information disclosed in this Background section is only to enhance the understanding of the background of the invention, and therefore it may contain information that does not constitute prior art.

SUMMARY

Embodiments of the present invention provide a novel, ground-up error-correcting code (ECC) architecture that is able to provide in-place error-detection and error-correction inside dynamic random-access memory (DRAM) using DRAM resources. Unlike previous SEC-DED and chipkill implementations, architecture of the described embodiments distributes ECC complexity to the DRAM module level. By reusing in-DRAM deduplication logic, data integrity checks using hash functions and secondary hash functions may be provided. That is, the same logic may be reused for both deduplication and error correction. Further, by using an approach based on hamming distance, the algorithm of the described embodiments also corrects errors with high reliability.

According to one embodiment, there is provided a method of performing memory deduplication and single error correction double error detection (SEC-DED) in a computer memory, the method including reading data from an array of memory chips, calculating at least one hash based on the data, checking the one or more hashes against at least one of a physical line ID hash and against a secondary hash, determining whether an error is detected, when an error is detected, correcting the data by changing each bit of the array of the memory chips one at a time until no error is detected, wherein between changing each bit, at least one hash is calculated based on the changed data, and the one or more hash for the new data is compared against one or more of a physical line ID hash and against a secondary hash, and again determining whether an error is detected, and outputting the corrected data when no error is detected.

The data may include eight bytes.

The array of memory chips may include 4-bit memory chips.

The array of memory chips may include sixteen memory chips.

A total number of bits in the array may be sixty-four.

The physical line ID hash and the secondary hash may include a 16-bit hash.

According to one embodiment, there is provided a method of performing memory deduplication and a single chipkill mechanism in a computer memory, the method including reading data from an array of memory chips, calculating at least one hash based on the data, checking the one or more hashes against at least one of a physical line ID hash and against a secondary hash, determining whether an error is detected, when an error is detected, correcting the data by changing values of each memory chip of the array of the memory chips one at a time until no error is detected, wherein between changing each memory chip, at least one hash is calculated based on the changed data, and the one or more hash for the new data is compared against one or more of a physical line ID hash and against a secondary hash, and again determining whether an error is detected, and outputting the corrected data when no error is detected.

The data may include eight bytes.

The array of memory chips may include 4-bit memory chips.

The array of memory chips may include sixteen memory chips.

A total number of bits in the array may be sixty-four.

The physical line ID hash and the secondary hash may include a 16-bit hash.

According to one embodiment, there is provided a method of performing memory deduplication and a double chipkill mechanism in a computer memory, the method including reading data from an array of memory chips, calculating at least one hash based on the data, checking the one or more hashes against at least one of a physical line ID hash and against a secondary hash, determining whether an error is detected, when an error is detected, correcting the data by changing values of each possible pair of memory chips of the array of the memory chips one at a time until no error is detected, wherein between changing each possible pair of memory chips, at least one hash is calculated based on the changed data, and the one or more hash for the new data is compared against one or more of a physical line ID hash and against a secondary hash, and again determining whether an error is detected, and outputting the corrected data when no error is detected.

The data may include eight bytes.

The array of memory chips may include 4-bit memory chips.

The array of memory chips may include sixteen memory chips.

A total number of bits in the array may be sixty-four.

The method may further include detecting an uncorrectable memory error, and using pins of an ECC chip to convey an uncorrectable memory error to a CPU.

The method may further include detecting an uncorrectable memory error, and sending a bus signal on an SMBus to convey uncorrectable memory errors to a memory host.

BRIEF DESCRIPTION OF THE DRAWINGS

These and other aspects of the described embodiments will be appreciated and understood with reference to the specification, claims, and appended drawings wherein:

DETAILED DESCRIPTION

Figure 1:
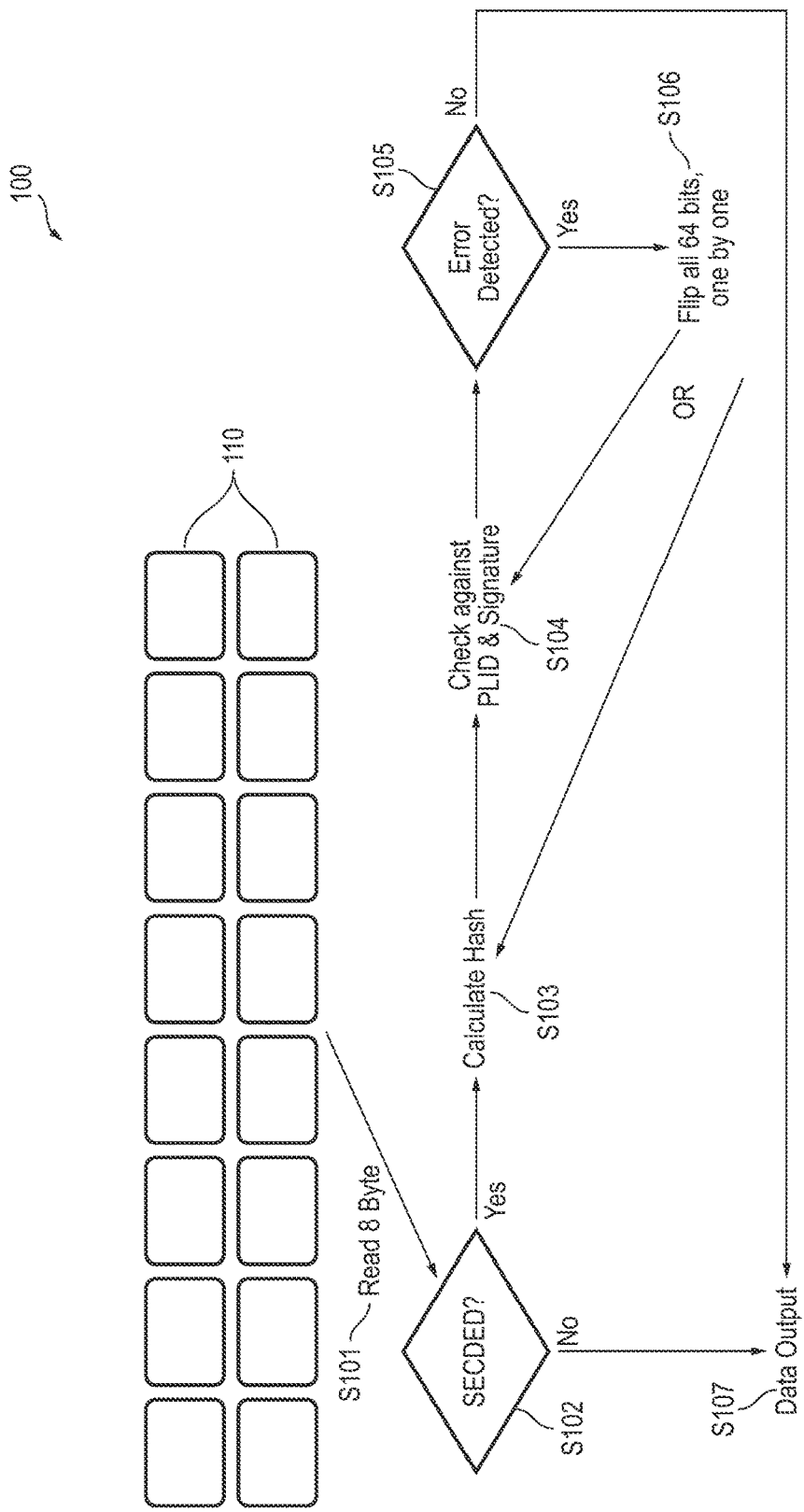
FIG. 1 is a block diagram depicting an error correcting code (ECC) architecture for performing single error correction double error detection (SEC-DED), according to an embodiment of the present invention.

Aspects of embodiments of the present disclosure are directed toward a system and method for error correction in computer memory.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the described embodiments.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The disclosure of the in-DRAM deduplication system disclosed in U.S. application Ser. No. 15/286,460, titled "A DRAM ASSIST ERROR CORRECTION MECHANISM FOR DDR SDRAM INTERFACE," is incorporated herein by reference.

Data deduplication, or data duplication elimination, refers to the reduction of redundant data in a memory device to thereby reduce capacity cost of the memory device. In data deduplication, a data object/item (e.g., a data file) is partitioned into one or more blocks of data. By associating a plurality of the blocks of data consisting of identical data with a single stored block of data, duplicate copies of the blocks of data may be reduced or eliminated by a computer memory, thereby reducing the overall amount of redundant copies of data in the memory device. The reduction of redundant copies of data may increase read latency and memory bandwidth, and may potentially result in power savings. Accordingly, if duplicated copies of data can be reduced to a single copy of the data, the overall available capacity of the memory device is increased while using the same amount of physical resources.

An in-DRAM deduplication system may be used according to embodiments of the present invention to implement error detecting and correcting mechanisms. For example, the deduplication hash bucket and data signature collectively provide two different hashes that may be used to detect errors during a read operation without changing the write path. Thereafter, the described embodiments can use brute-force for error correction, thereby eliminating the error-correcting code (ECC) system normally used on high end DRAM.

Accordingly, the described embodiments provide a DRAM deduplication architecture that may be used to implement ECC. The DRAM deduplication architecture may already use a deduplication hash bucket and secondary hashes (e.g., signature hashes, or signature value hashes) to provide two hashes. The deduplication hash bucket and the secondary hashes however, can be repurposed, or reused, for error correction. That is, the deduplication hash bucket and the secondary hashes can be used to detect data errors upon a data read request, without making changes to a write-path. For example, the DRAM deduplication architecture may read stored data, rehash the read data, and then determine whether the deduplication hash bucket and the secondary hashes match the expected hashes. If the rehashed values do not match the expected hashes, then an error is assumed.

Challenges involved with SEC-DED and chipkill error correcting methods of conventional technologies include extra chip overhead and centralized controller complexity, while scaling problems may exacerbate DRAM errors.

Further, the embodiments described below are described with an ECC architecture that employs 8-byte deduplication granularity, wherein deduplication occurs using 8-byte blocks. However, other embodiments of the present invention may use other deduplication granularity.

FIG. 1 is a block diagram depicting an error correcting code (ECC) architecture for performing single error correction double error detection (SEC-DED), according to an embodiment of the present invention.

Referring to FIG. 1, in a method of performing SEC-DED 100, the ECC architecture of the present embodiment may use sixteen 4-bit memory chips 110. The ECC architecture may allow for eight bytes to be read (S101) from the sixteen 4-bit memory chips 110. If it is determined that SEC-DED 100 is not to be performed (S102), the ECC architecture may simply output the data (S107). If it is otherwise determined that SEC-DED 100 is to be performed (S102) the SEC-DED may be performed by calculating the translated table address (TTA)/physical line ID (PLID) hash and the secondary hash of the read data (S103), and by checking those resulting hashes against the already known TTA and against the secondary hash for the data (S104). Although both of the TTA and the secondary hash are used in the present embodiment to determine whether SEC-DED 100 is to be performed (S102), in other embodiments, a single hash may be used and checked against a corresponding one of the TTA and the secondary hash for the data to determine whether SEC-DED 100 is should be performed.

If no error is detected (S105), the data may be retrieved and output (S108). If there is an error detected (at S105), however, brute force may be used to correct the error, by having the ECC architecture go through each bit of the erroneous data, and changing each of the bits one bit at a time (S106) and rehashing the result. When the modified data produces hashes that match the known TTA and secondary hash, the error is considered corrected. Use of this brute force method, however, enables the elimination of ECC extra chip overhead.

That is, the ECC architecture may flip/change up to all sixty-four bits of the sixteen 4-bit memory chips 110, one at a time, while thereafter either recalculating the hash (S103) or checking whether a match exists by checking against a translated table address (TTA) (e.g., the PLID hash) and the secondary hash (S104), or, alternatively, whether an error is still detected (S105) between switching each bit. If the error is still detected/when no match is found, the ECC architecture changes back the changed bit, and proceeds to flip the next bit (S106).

After flipping the next bit, the ECC architecture checks whether an error is detected (S105) by again calculating the hash, and checking the calculated hashes against the TTA and against the secondary hash (S104). Upon correcting the erroneous bit such that no error is detected (S105) after calculating the hashes and comparing against the TTA and the secondary hash (S104), the ECC architecture may output the data (S107).

Accordingly, the complexity of the SEC-DED process 100 of the present embodiment requires only, at most, sixty-four operations to correct a single-bit error (i.e., one operation for each flipped/changed bit of the sixteen 4-bit memory chips 110). However, there is an undesirable possibility of the occurrence of two matches, which would result in an undetected silent failure, causing the incorrect data to be output at S107. That is, there may be a hash collision, such that incorrect output data happens to hash onto the same hash as correct data, although the present embodiment may correct or avoid this issue by using cryptographically exclusive hashes for the TTA and secondary hash. Also, by performing the above described SEC-DED process first, which may be run through a standard error correction algorithm, the silent error may result from the error being more than the standard SEC-DED is able to detect.

Further, the system employing the present embodiment may be protected from such undetectable or uncorrectable errors by first reducing the likelihood of hash collisions. Additionally, a fail-safe mechanism may be employed in the present embodiment to communicate uncorrectable errors with the operating system (OS) via a system management bus (SMBus) with support from BIOS, thereby allowing the CPU to be unmodified while employing the present embodiment. Alternatively, if memory controller logic may be slightly modified, the uncorrectable errors can be communicated by reusing the pins of the ECC chip. That is, the dual in-line memory module (DIMM) may be ECC wide (e.g., 72 pins), but the additional chip need not be occupied by ECC data.

Figure 2:
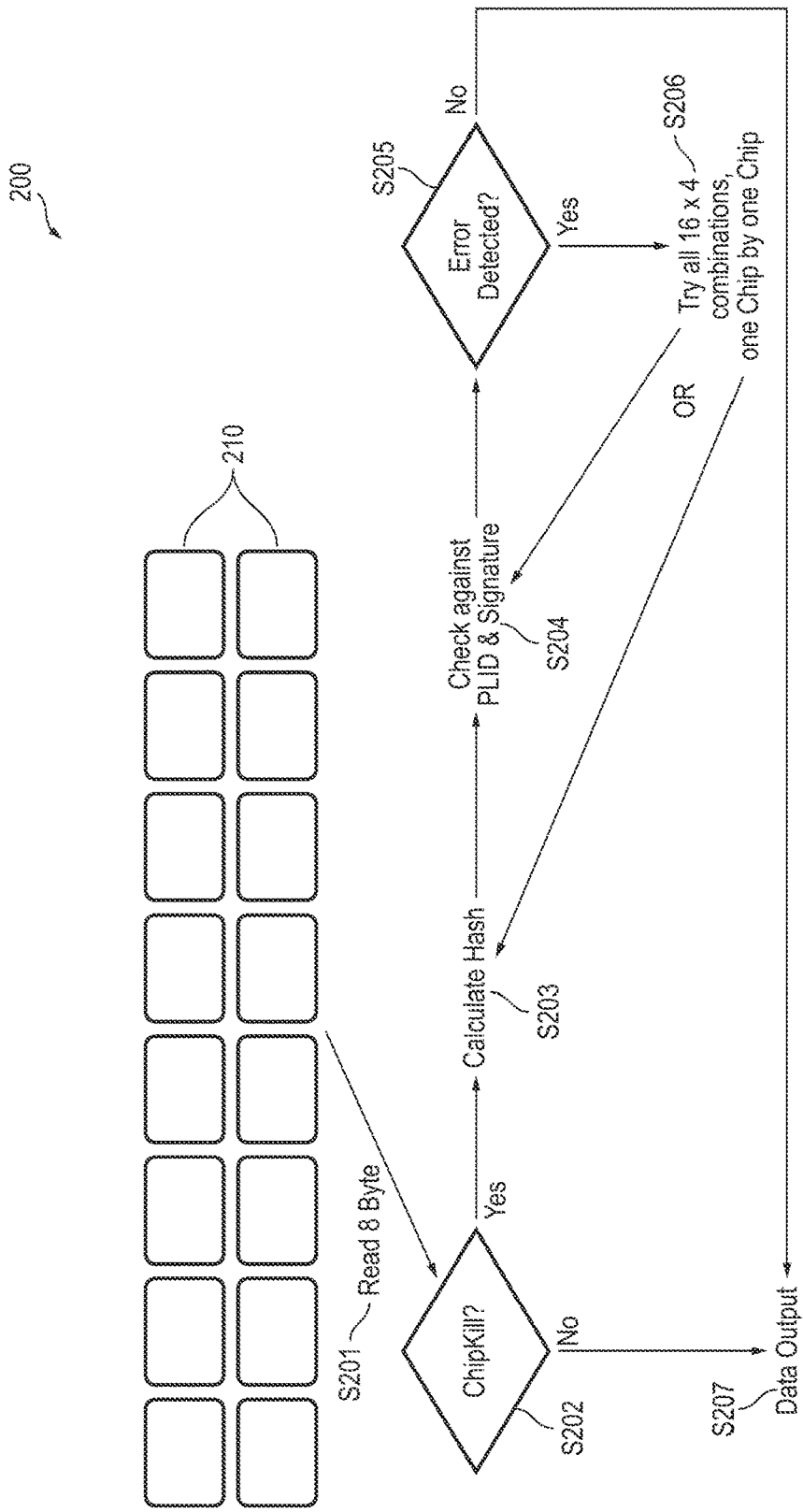
FIG. 2 is a block diagram depicting an error correcting code (ECC) architecture for performing a single chipkill procedure, according to an embodiment of the present invention.

FIG. 2 is a block diagram depicting an error correcting code (ECC) architecture for performing a single chipkill-like procedure, according to an embodiment of the present invention.

Referring to FIG. 2, in a method of performing a chipkill process 200 of the present embodiment, the ECC architecture of the present embodiment may use sixteen 4-bit memory chips 210. The ECC architecture of the present embodiment may allow for eight bytes to be read (S201) from the sixteen 4-bit memory chips 210. The ECC architecture then determines whether a chipkill procedure is to be performed (S202). If it is determined that no chipkill procedure is to be performed, the ECC architecture may simply output the data (S207). Otherwise, the chipkill procedure may begin to be performed by first calculating the TTA and secondary hash for the read data (S203), and checking against the TTA and against the secondary hash (S204) already known for the stored data.

The ECC architecture then determines whether an error is detected (S205) by comparing the read data hash with the known hash. If no error is detected, the data may be retrieved and output (S207). However, if an error is detected, a number of potential errors exists. That is, in comparison to the SEC-DED process 100 described with respect to the embodiment of FIG. 1, there is a greater number of potential error combinations. Specifically, the chipkill process 200 of the present embodiment examines the potential errors chip-by-chip (S206) for each of the memory chips 210, instead of bit-by-bit as described with the SEC-DED process 100. Each time a potential error is examined and attempted to be corrected (S206), the architecture again either recalculates the hash (S203) or checks the potentially-corrected data's hashes against the TTA and against the secondary hash (S204).

Accordingly, the ECC architecture performing the chipkill process 200 must examine up to sixteen combinations for each memory chip 210 in performing the computations to determine whether an error exists. Accordingly, the maximum number of operations in the detection of the error is 256 operations (i.e., 16*16).

Figure 3:
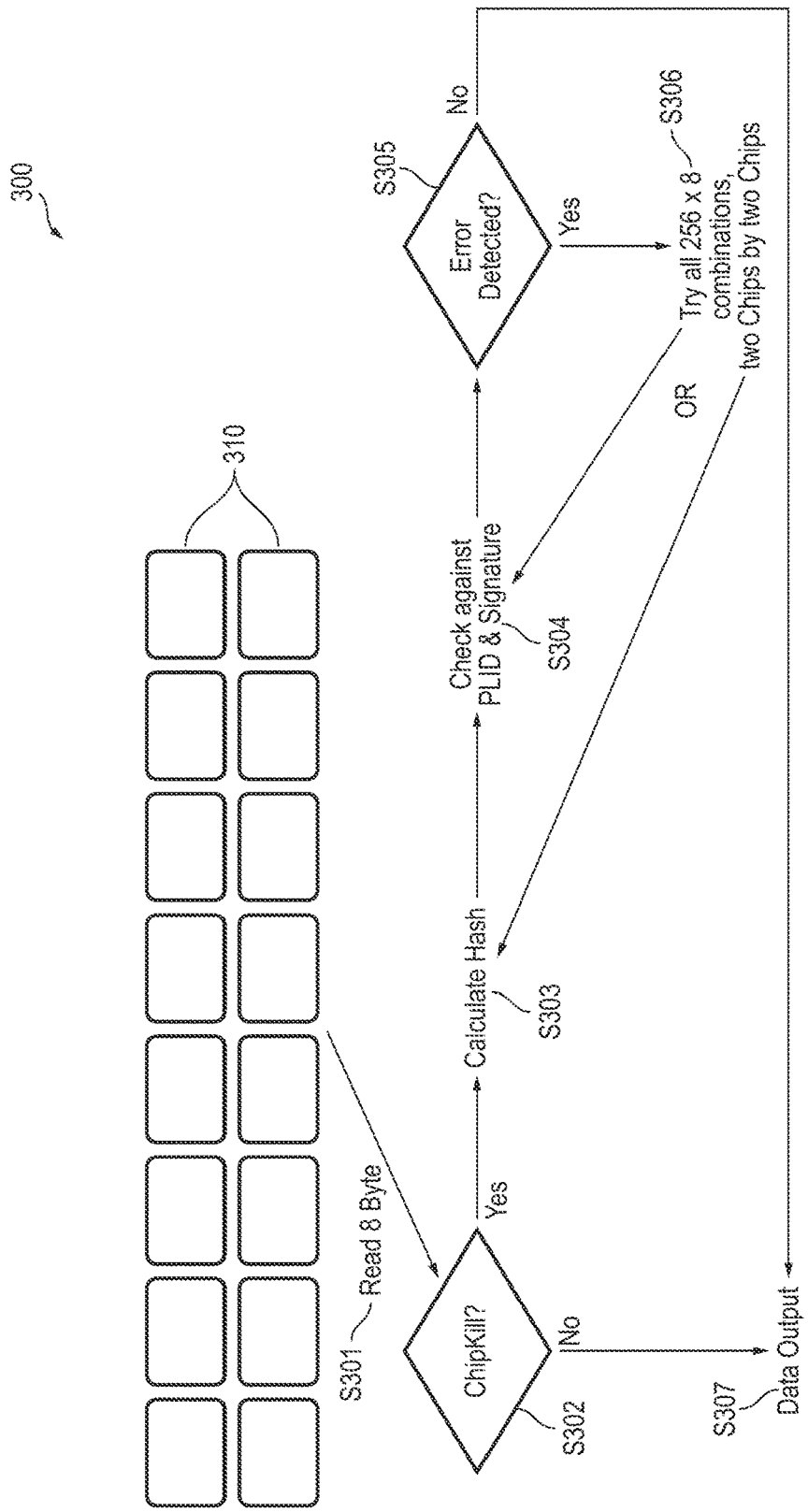
FIG. 3 is a block diagram depicting an error correcting code (ECC) architecture for performing a double chipkill procedure, according to an embodiment of the present invention.

FIG. 3 is a block diagram depicting an error correcting code (ECC) architecture for performing a double chipkill procedure, according to an embodiment of the present invention.

Referring to FIG. 3, in a method of performing a double chipkill process 300 of the present embodiment, the ECC architecture may use sixteen 4-bit memory chips 310. The ECC architecture may allow for eight bytes to be read (S301) from the sixteen 4-bit memory chips 310. The ECC architecture then determines whether a chipkill procedure is to be performed (S302). If it is determined that no double chipkill procedure is to be performed, then the ECC architecture of the present embodiment may simply output the data (S307). However, if it is determined that the double chipkill procedure is to be performed, the ECC architecture of the present embodiment initially calculates the TTA and the secondary hash for the read data (S303), and then checks against the already known TTA and against the secondary hash (S304) for the written data.

The ECC architecture then determines whether an error is detected (S305) by comparing the TTA and the secondary hash for the read data with the known hashes for the written data. If no error is detected, then the data may be simply retrieved and output (S307). However, if there is an error detected, a greater number of potential error combinations exists in comparison to the SEC-DED process 100 of FIG. 1, and in comparison to the single chipkill process 200 of FIG. 2. That is, the double chipkill process 300 examines the potential errors in pairs of chips (e.g., two chips by two chips) (S306), instead of bit-by-bit with the SEC-DED process 100, and instead of chip-by-chip with the single chipkill process 200. The architecture may then either recalculate the hash (S303) or check the potentially-corrected data's hashes against the TTA and against the secondary hash (S304). Accordingly, the ECC architecture may examine up to 256 multiplied by 8 combinations of different pairs of chips (e.g., two chips by two chips) in performing the computations to determine whether an error exists. Accordingly, the maximum number of operations in the detection of the error is 30,720 operations (i.e., $16C2*2^8$). Although the method of performing the double chipkill process 300 may be viewed as a brute force method, a procedure comprising 30,720 operations is achievable for modern processors.

The ECC architecture of the above embodiments assumes the use of 8-byte deduplication granularity, wherein deduplication occurs using 8-byte blocks. Because the deduplication granularity is higher than conventional methods, complexity is also increased. For example, conventional methods may detect an error at 8-bit hash level, while the present ECC architecture may use a 16-bit hash, thereby resulting in additional computations to enable corresponding error correction logic. Further, overhead corresponding to a translation table, which may be increased when compared to conventional ECC, may be justified, although a corresponding value may be stored in a DIMM used in conjunction with the ECC architecture.

Further, the algorithmic complexity that is achieved by the ECC architecture of the described embodiments also enables matching both the TTA and the secondary hash for robustness. Additionally, the probability that the two combinations have the same signature and hash (e.g., the probability that a hash collision occurs), is based on the hashing algorithm associated with the ECC architecture. Accordingly, and for example, improving the hashing algorithms, or increasing the signature size, may reduce the probability of a hash collision, although doing so may result in additional storage for a larger TTA or signature size.

Further, the ECC architecture of the embodiments described above may be integrated with other ECC reporting mechanisms, and may face interface error challenges, such as accurate signaling of uncorrectable error signaling to the integrated CPU via a system management bus (SMBus). That is, the overall DIMM or system architecture employing the abovedescribed embodiments may interact with the host CPU system, and may employ a bus signal on the SMBus to convey uncorrectable memory errors to the host. Another embodiment may also repurpose pins of the ECC chip to convey uncorrectable memory errors to the CPU, although memory controller changes may be implemented as a result.

Accordingly, regardless of the form of error correction (e.g., whether error correction takes the form of a SEC-DED, a chipkill, or a double chipkill), upon discovery of an error, the ECC architecture can use the preexisting hashes for TTA and secondary hash, and thereafter perform computations until the architecture matches the predicted block of data, and can thereafter presume that the predicted block of data is the desired data, thereby providing fast and robust methodologies to perform error detection and correction without additional controller and chip complexity.

Furthermore, the described embodiments provide an ECC solution built into a large capacity memory module along with the supporting system framework, and also provide a system architecture that provides ECC at the module level by reusing deduplication architecture, and that reduces the controller complexity, access latency and improving data integrity. Additionally, it should be noted that the embodiments described above have been implemented with a 16×4 chip architecture. However, one of ordinary skill in the art can modify these teachings to apply other embodiments of the present invention to other chip architectures.

While the present invention has been particularly shown and described with reference to exemplary embodiments thereof, it will be understood by those of ordinary skilled in the art that various changes may be made therein without departing from the scope of the present invention as defined by the following claims and their functional equivalents. Therefore, technical scope of the present invention should not be construed as limited to those described in the description, but determined by the appended claims and their functional equivalents.

What is claimed is:

1. A method of reducing access latency and improving data integrity by performing memory deduplication and single error correction double error detection (SEC-DED) in a computer memory, the method comprising:
   reading, by a processor on a memory chip, data from an array of memory chips;
   calculating, by the processor, one or more hashes based on the data;
   checking, by the processor, the one or more hashes against a physical line ID hash to determine whether the one or more hashes matches the physical line ID hash;
   detecting, by the processor, an error based on the one or more hashes being different from the physical line ID hash;
   correcting, by the processor, the error by sequentially flipping a data value of each bit, for up to all bits, of the array of the memory chips by performing a write operation using error-correcting code (ECC) to generate changed data until no error is detected;
   after flipping the data value of a respective bit of the bits, calculating, by the processor, at least one hash based on the changed data, and comparing the at least one hash based on the changed data against the physical line ID hash to determine whether the at least one hash matches the physical line ID hash;
   accepting, by the processor, the changed data as corrected data when the at least one hash matches the physical line ID hash; and
   outputting, by the processor, the corrected data.

2. The method of claim 1, wherein the data comprises eight bytes.

3. The method of claim 1, wherein the array of memory chips comprises 4-bit memory chips.

4. The method of claim 1, wherein the array of memory chips comprises sixteen memory chips.

5. The method of claim 1, wherein a total number of bits in the array is sixty-four.

6. The method of claim 1, wherein the physical line ID hash comprises a 16-bit hash.

7. The method of claim 1, further comprising:
   detecting an uncorrectable memory error by determining more than one chip of the array of memory chips contain a data error as the error during a read operation; and
   using pins of an ECC chip to convey an uncorrectable memory error to a CPU.

8. The method of claim 1, further comprising:
   detecting an uncorrectable memory error by determining more than one chip of the array of memory chips contain a data error as the error during a read operation; and
   sending a bus signal on an SMBus to convey an uncorrectable memory error as the error to a memory host.

9. A method of reducing access latency and improving data integrity by performing memory deduplication and a single chipkill mechanism in a computer memory, the method comprising:
   reading data, by a processor on a memory chip, from an array of memory chips;
   calculating, by the processor, one or more hashes based on the data;
   checking, by the processor, the one or more hashes against a physical line ID hash to determine whether the one or more hashes matches the physical line ID hash;
   detecting, by the processor, an error based on the one or more hashes being different from the physical line ID hash;
   correcting, by the processor, the error by sequentially flipping a data value of each bit, for up to all bits, of each memory chip of the array of the memory chips for up to all of the memory chips by performing a write operation using error-correcting code (ECC) to generate changed data until no error is detected;
   after flipping the data value of a respective bit of the bits, calculating, by the processor, at least one hash based on the changed data, and comparing the at least one hash based on the changed data against the physical line ID hash to determine whether the at least one hash matches the physical line ID hash;
   accepting, by the processor, the changed data as corrected data when the at least one hash matches the physical line ID hash; and
   outputting, by the processor, the corrected data.

10. The method of claim 9, wherein the data comprises eight bytes.

11. The method of claim 9, wherein the array of memory chips comprises 4-bit memory chips.

12. The method of claim 9, wherein the array of memory chips comprises sixteen memory chips.

13. The method of claim 9, wherein a total number of bits in the array is sixty-four.

14. The method of claim 9, wherein the physical line ID hash comprises a 16-bit hash.

15. A method of reducing access latency and improving data integrity by performing memory deduplication and a double chipkill mechanism in a computer memory, the method comprising:
   reading, by a processor on a memory chip, data from an array of memory chips;
   calculating, by the processor, one or more hashes based on the data;
   checking, by the processor, the one or more hashes against a physical line ID hash to determine whether the one or more hashes matches the physical line ID hash;
   detecting, by the processor, an error based on the one or more hashes being different from the physical line ID hash;
   correcting, by the processor, the error by sequentially flipping a data value of each bit, for up to all bits, of each pair of memory chips of the array of memory chips for up to all possible pairs of memory chips of the array of the memory chips by performing a write operation using error-correcting code (ECC) to generate changed data until no error is detected;

after flipping the data value of a respective bit of the bits, calculating, by the processor, at least one hash based on the changed data, and comparing the at least one hash based on the changed data against the physical line ID hash to determine whether the at least one hash matches the physical line ID hash;

accepting, by the processor, the changed data as corrected data when the at least one hash matches the physical line ID hash; and outputting, by the processor, the corrected data.

16. The method of claim 15, wherein the data comprises eight bytes.

17. The method of claim 15, wherein the array of memory chips comprises 4-bit memory chips.

18. The method of claim 15, wherein the array of memory chips comprises sixteen memory chips.

19. The method of claim 15, wherein a total number of bits in the array is sixty-four.

\* \* \* \* \*